UNITED STATES PATENT OFFICE.

CHARLES L. JONES, OF PEDLER TOWNSHIP, VIRGINIA.

IMPROVEMENT IN MEDICAL COMPOUNDS FOR CURE OF HOG CHOLERA.

Specification forming part of Letters Patent No. 121,523, dated December 5, 1871.

*To all whom it may concern:*

Be it known that I, CHARLES L. JONES, of Pedler township, in the county of Amherst and State of Virginia, have invented certain new and useful Improvements in Compound for Cure of Hog Cholera; and I do hereby declare that the following is a full and exact description thereof.

My invention has for its object to provide a compound which shall be, when properly administered, a perfect cure for the disease among swine commonly known as hog cholera; and consists in compounding in about equal proportions the ingredients hereinafter set forth.

I am aware that many compounds, &c., have been patented and otherwise published claiming to cure this disease, but none to my knowledge (and I am familiar with breeding and raising of swine) have ever been proven to be a certain cure.

To enable others skilled to make and use my improved hog-cholera medicine, I will proceed to describe the ingredients, how compounded and administered.

I take dittany, (leaf or root,) iron-weed, (leaf or root,) wild or other ginger, blue cohosh, copperas, sulphur, and charcoal, of equal parts, and having first reduced them each as near as possible to a powder, mix them well together, and administer in the food of the swine, giving as a dose a tablespoonful every other day, or, in extreme cases, two tablespoonfuls every day.

I have found after several years, from experience, that a cure is certain in every case, and that this compound not only effects a permanent cure, but will, in every instance, so improve the condition of the hog that it will fatten doubly as fast on a given quantity of food. Of course I do not wish to limit myself to the exact proportions set forth, but desire to cover, broadly, the idea of compounding together for the first time the ingredients heretofore mentioned to produce the desired result.

Having described the nature, advantages, &c., of my invention, what I claim as new, and desire to secure by Letters Patent, is—

The compound for cure of hog cholera, composed of the ingredients and in about the proportions hereinbefore set forth.

Witness my hand and seal to the foregoing specification this 31st day of May, 1871.

CHAS. L. JONES. [L. S.]

Witnesses:
JUAN BOYLE,
C. K. MCBLAIR.

(98)